(12) United States Patent
Verbo et al.

(10) Patent No.: US 6,826,999 B2
(45) Date of Patent: Dec. 7, 2004

(54) PNEUMATIC BOOSTER

(75) Inventors: Ulysse Verbo, Sant Cugat (ES);
Philippe Richard, Chelles (FR);
Jean-Charles Maligne, Aubervilliers (FR); Stephane Lacroix, Tournan en Brie (FR)

(73) Assignee: Robert Bosch GmbH, Stuttgart (DE)

( * ) Notice: Subject to any disclaimer, the term of this patent is extended or adjusted under 35 U.S.C. 154(b) by 7 days.

(21) Appl. No.: 10/394,469

(22) Filed: Jun. 4, 2003

(65) Prior Publication Data

US 2003/0214178 A1 Nov. 20, 2003

(30) Foreign Application Priority Data

Mar. 21, 2002 (FR) .............................. 02 03581
Jan. 7, 2003 (FR) .............................. 03 00116

(51) Int. Cl.[7] .................................................. F15B 9/10
(52) U.S. Cl. ................................. 91/376 R; 91/369.2
(58) Field of Search ........................... 91/376 R, 369.3, 91/369.2

(56) References Cited

U.S. PATENT DOCUMENTS

| | | | | |
|---|---|---|---|---|
| 4,885,979 A | * | 12/1989 | Macht et al. | 91/376 R |
| 5,367,941 A | * | 11/1994 | Gautier et al. | 91/376 R |
| 5,579,675 A | * | 12/1996 | Gautier et al. | 91/376 R |
| 5,904,088 A | * | 5/1999 | Ogura et al. | 91/376 R |
| 6,213,569 B1 | * | 4/2001 | Tsubouchi | 91/376 R |

* cited by examiner

Primary Examiner—Edward K. Look
Assistant Examiner—Michael Leslie
(74) Attorney, Agent, or Firm—Leo H McCormick, Jr.; Warren Comotock

(57) ABSTRACT

A pneumatic brake booster for a motor vehicle wherein movements of a control rod (38) determine the openings and closings of at least one axial intake valve (52) and at least one equalizing valve (50). The intake valve (52) being inserted between a pressure source subjected to the pressure ($P_a$) higher than the first pressure ($P_1$) and a rear chamber (18) of the booster, and the equalizing valve (50) being inserted between a front chamber (16) and the rear chamber (18) to actuate a moving partition (14) located between the front chamber (16) and the rear chamber (18). A tubular element (76) of that is axially offset transverse faces (78, 80) comprised of first elements (82, 84) for sealing the axial intake and equalizing valves (50, 52).

25 Claims, 11 Drawing Sheets

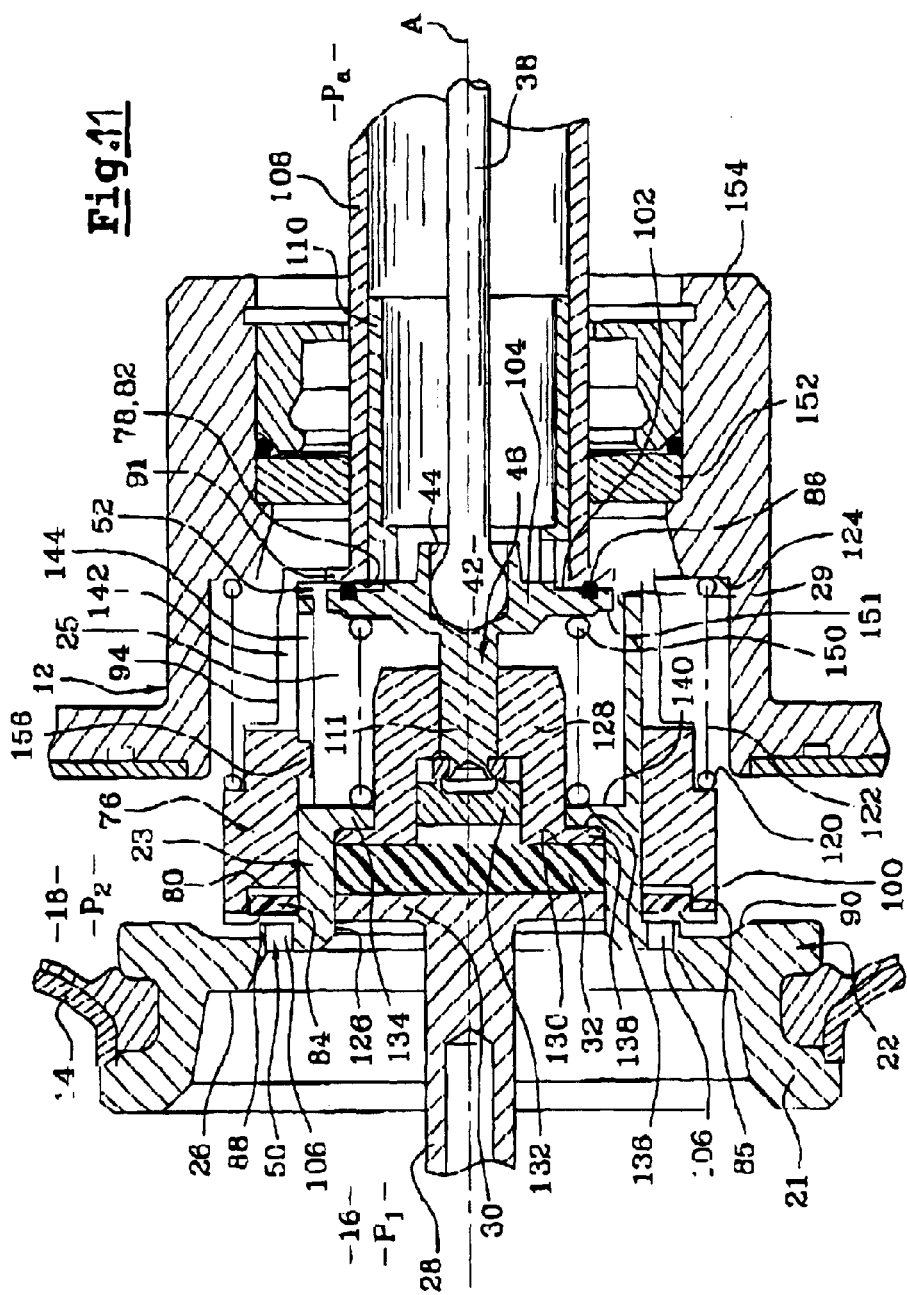

PNEUMATIC BOOSTER

The invention relates to a pneumatic brake booster for a motor vehicle having a control valve with offset intake and equalizing valve seats.

BACKGROUND OF THE INVENTION

The invention relates more particularly to a pneumatic brake booster for a motor vehicle, of the type comprising a rigid casing inside which there can move a transverse partition sealingly delimiting a front chamber, subjected to a first pressure, and a rear chamber subjected to a second pressure that varies between the first pressure and a pressure higher than the first pressure, which is able to act on an actuating rod of a master cylinder associated with the booster by way of a reaction disk, of the type which comprises a tubular moving piston which is slideably mounted in the casing and which is secured to the moving partition, of the type which comprises a control rod moving in the piston selectively according to an axial input force exerted forward against the action of a return force exerted on the rod via a return spring, of the type in which the movements of the control rod are able to determine the openings and closings of at least one axial intake valve which is inserted between a pressure source subjected to the pressure higher than the first pressure and the rear chamber, and of at least one axial equalizing valve which is inserted between the front chamber and the rear chamber, to actuate the moving partition, and of the type in which a plunger, passing through the moving partition and secured to the end of the control rod, is able to act directly upon the actuating rod of the master cylinder by way of the reaction disk.

Numerous examples of conventional boosters of this type are known.

In such a booster, the piston is secured to the moving wall. It is, for example, fitted through the moving partition. Furthermore, the equalizing valve and the intake valve form part of a single three-way valve a common seat of which is formed of a stepped front face of a moving element which is elastically returned against a flange of the plunger and against a flange of the piston from which flanges it can be selectively separated in order to open the equalizing valve or the intake valve.

Thus, a roughly radial duct which passes through the piston and which opens into the front chamber and a roughly axial duct which opens to the outside of the booster can be placed selectively in communication by way of one of the valves with a radial duct which passes through the piston and which opens into the rear chamber in order to maintain or cancel a pressure difference between the rear chambers and cause the moving partition to move.

Such a design has the disadvantage of entailing ducts made in the piston with complex shapes, which disturb the air flow. As a result, a booster produced according to this design generally has relatively high response times and proves noisy.

Furthermore, such a design is particularly expensive to implement because it entails the use of a piston whose interior shapes, intended to form the ducts, can be produced only by a machining method.

SUMMARY OF THE INVENTION

The invention proposes a design which allows these disadvantages to be remedied and in which the ducts are axial and form part of various tubular elements of the booster. This design encourages the air to flow through the valves, and this makes it possible to reduce the booster response times while at the same time giving it quiet operation. What is more, this new design allows most of the booster elements to be made using a pressing method which is less expensive than the conventional machining methods.

To this end, the invention proposes a booster of the aforementioned type, characterized in that it comprises:

a floating tubular element external to the plunger, which is axially mobile and which is elastically returned toward the moving partition, of which axially offset transverse faces have first sealing elements for the axial intake and equalizing valves, a complementary transverse second sealing element for the axial intake valve, borne by the rear end of the plunger, a complementary transverse second sealing element for the axial equalizing valve, consisting of at least one portion of the rear face of the moving partition.

According to other features of the invention at least a first sealing element consists of a seal borne by an attached tubular bushing slideably mounted in the floating tubular element, the floating tubular element comprises, a tubular intermediate section, which is slideably mounted in an intermediate section of the piston which is roughly cylindrical and around a tubular bearing surface of the moving partition which slideably houses the plunger, a tubular front end section of a diameter greater than the diameter of the intermediate section, which is housed in a perforated front section of the piston lying where the piston and the moving partition meet, which internally houses a seal of which a front face forms the first sealing element for the equalizing valve and which is intended to collaborate with that portion of the rear face of the moving partition forming the second sealing element for the equalizing valve which is arranged radially on the outside of at least one drilling providing communication between the front chamber and the rear chamber, a tubular rear end section, of a diameter smaller than the diameter of the intermediate section, which internally houses the tubular bushing of which a transverse front end face bears a seal forming the first sealing element for the intake valve which is intended to collaborate with the second sealing element borne by the plunger, and of which a bore sealingly surrounds an axial inlet take duct in the piston communicating with the pressure source subjected to the pressure greater than the first pressure, the plunger is guided in a tubular bearing surface which extends axially from the rear face of the moving partition and the moving partition comprises a plurality of drillings distributed angularly through the transverse partition around the region when its tubular bearing surface and its rear face meet, a stepped face delimiting the tubular intermediate section and the tubular section of the tubular element has, bearing against it, the end of a return spring the other end of which bears against a stepped face of the tubular piston, a radial stop pin, of which the ends external to the piston are able to bear against the casing of the booster, passes through a drilling in the plunger, through two diametrically opposed slots in the tubular bearing surface of the moving partition, through two diametrically opposed slots in the element, and through two diametrically opposed slots in the piston, the diametrically opposed slots in the piston form part of the perforations in the piston, the intermediate section of the piston, of a determined diameter, includes the intake duct, of a diameter smaller than the determined diameter, with which it is integrally formed, and the intake duct is connected to the intermediate section by way of a transverse wall formed integrally and a front face of which forms the stepped face against which the return spring of the tubular element bears and the rear face of which forms a stepped face against which the return spring of the control rod bears, the transverse second sealing element for the axial intake valve is borne by a cup mounted tightly on the rear end of the cylindrical plunger and a transverse rear face of which extends opposite the seal forming the transverse first sealing element, the moving partition, the floating tubular element, the tubular bushing secured to the floating tubular element, the piston and the cup secured to the plunger are produced using cutting and pressing methods, a return spring is inserted axially into the floating tubular element between the plunger and the rear section of the tubular piston so as to exert a return force on the control rod, the axial intake valve is arranged at the end of an interior chamber of the tubular piston which chamber is formed in the rear section of the piston and communicates radially with the rear chamber, the transverse first sealing element for the axial intake valve surrounding an axial intake duct which is formed in the floating tubular element and which communicates with the external surroundings and the complementary transverse second element for sealing the axial intake valve being received with clearance in an axial drilling in the piston communicating with the interior chamber, the axial equalizing valve is arranged on the outside of the tubular piston and is arranged radially on the outside of at least one equalizing duct of the tubular piston placing the front chamber and the rear chamber in communication.

The floating tubular element comprises a tubular front section, slideably mounted on the rear section of the piston, which bears the first sealing element for the equalizing valve, and which is intended to collaborate with the second sealing element of the equalizing valve borne by the portion of the rear face of the front section of the piston, the first and second sealing elements for sealing the equalizing valve being arranged radially at least in part on the outside of at least one drilling providing communication between the front chamber and the rear chamber which passes through the front section of the piston; a tubular intermediate section which is slideably mounted on the rear section of the piston, and of which at least one longitudinal slot is formed radially in line with at least one longitudinal slot in the rear section of the piston which allows communication between the interior chamber of the piston and the rear chamber; a tubular rear section, of a diameter smaller than the diameter of the intermediate section, which forms the duct communicating with the external surroundings and which is slideably mounted on at least one tubular rear section of the plunger through which the control rod passes; and a transverse joining wall joining the intermediate and rear sections of the tubular element, and arranged more or less axially near the drilling in the end of the tubular rear section of the piston, comprises the first sealing element for the axial intake valve which is intended to collaborate with the second sealing element for the axial intake valve which is borne by the plunger and which is housed in the said end drilling of the tubular rear section of the piston.

The first sealing element for the axial intake valve consists of an annular part of the front face of the transverse wall joining the intermediate and rear sections of the tubular element; the complementary transverse second sealing element for the axial intake valve consists of an annular seal borne by an annular rear face of a cup carried by the plunger and which is housed with clearance in the end drilling of the chamber of the tubular piston; the first sealing element for the axial equalizing valve consists of an annular seal which is housed in a groove made in the front face of the tubular front end section of the tubular element; the complementary transverse second sealing element for the axial equalizing valve consists of an annular portion of the rear face delimiting the front and rear sections of the tubular piston.

The booster comprises a plurality of drillings which are angularly distributed in a uniform manner through the front section of the piston and which open into the rear face delimiting the front and rear sections of the tubular piston to form the equalizing ducts; the body of the piston has an internal axial bore which opens into the front face of the piston and into the interior chamber of the piston and which houses the end of the actuating rod of the master cylinder, the reaction disk, a sliding bushing, through which there passes a front section of the plunger, of which a step constitutes a front face coaxial with a feeler formed at the front end of the plunger to act upon the reaction disk.

A transverse wall, formed at the end of the internal axial bore, forms, on the one hand, an end stop for the step of the bushing and, on the opposite side receives the end of the return spring the other end of which rests against a front face of the cup of the plunger.

A stepped face delimiting the front section and the intermediate section of the tubular element has, bearing against it, the end of a return spring the other end of which bears against a stepped face of the casing.

The cup is inserted axially between the rear and front sections of the plunger with which it is integral while an annular seal is inserted between a tubular rear section of the casing and the tubular rear section of the floating tubular element, so as to provide a seal between the external surroundings and the rear chamber of the booster. The intermediate section of the floating tubular element has a plurality of longitudinal slots each arranged in line with longitudinal slots in the rear section of the piston, and the intermediate tubular section of the floating tubular element has at least one rotation-proofing finger which is slideably mounted in at least one of the said slots in the rear section of the piston, at least one element out of the moving partition, the floating tubular element, the intermediate bushing, the plunger and the piston, is produced using cutting and pressing methods, at least one element out of the moving partition, the floating tubular element, the intermediate bushing, the plunger and the piston, is made using a method of molding a plastic.

Other features and advantages of the invention will become apparent from reading the detailed description which follows, for an understanding of which reference will be made to the appended drawings.

BRIEF DESCRIPTION OF THE DRAWINGS

FIG. 11 is a detailed view in axial section of a booster produced according to the second embodiment of the present invention viewed in a return position, the plunger being released, the equalizing valve being open and the intake valve having closed again.

DETAILED DESCRIPTION OF THE INVENTION

Figure 1:
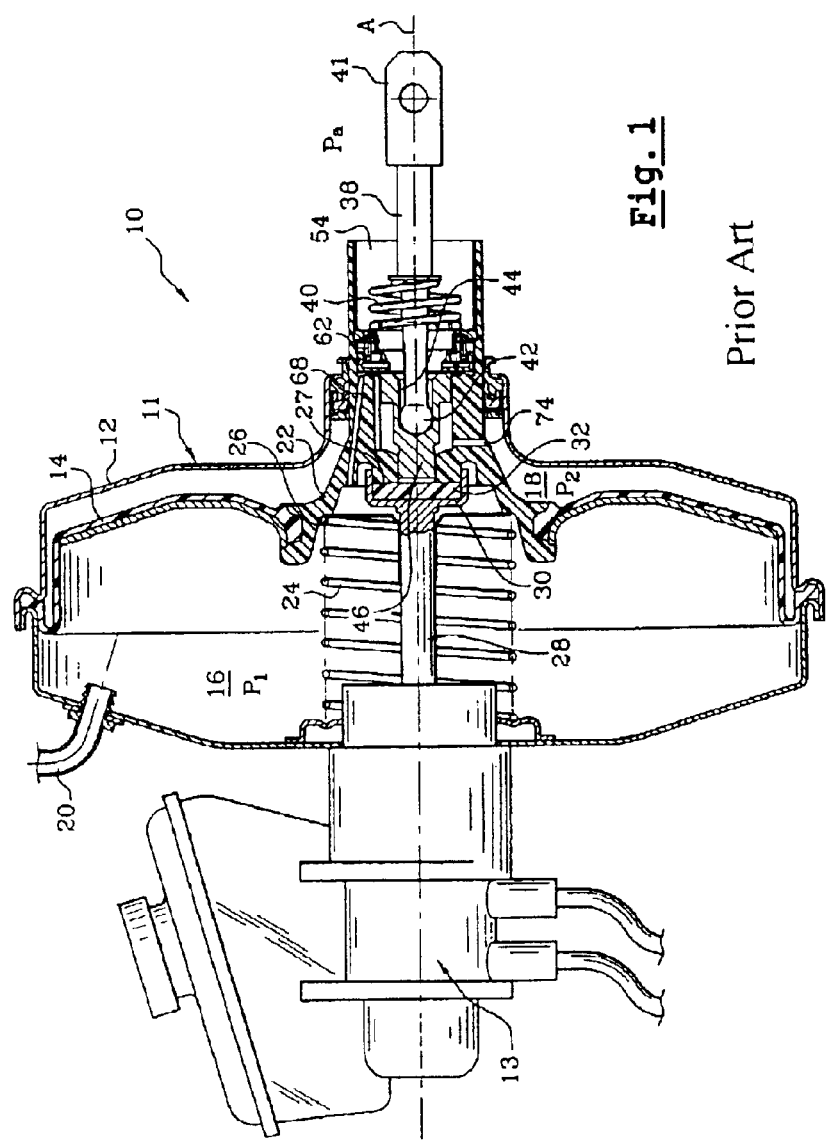
FIG. 1 is an overall view of an axial section of a boosted brake comprising a pneumatic brake booster produced according to the prior art.

In the description which will follow, identical reference numerals denote parts which are identical or have similar functions.

By convention, the terms "front", "rear", "upper" and "lower" refer respectively to elements or positions facing the left, the right, the top or bottom respectively of FIGS. 1 to 11.

FIG. 1 depicts the entirety of a boosted brake 10 comprising a conventional pneumatic brake booster 11 for a motor vehicle. The booster 11 is intended to actuate a master cylinder 13 concerned with braking the vehicle.

In a known way, the pneumatic booster 10 comprises a rigid casing 12 inside which is movably mounted a transverse partition 14 which sealingly delimits a front chamber 16, subjected to a first pressure "$P_1$", and a rear chamber 18 subjected to a second pressure "$P_2$". The second pressure "$P_2$" is able to vary between the value of the pressure "$P_1$" and the value of a pressure "$P_a$" higher than the pressure "$P_1$" so as to cause movements of the partition 14 which is able, as will be seen later, to act upon an actuating rod 28 of the master cylinder 13.

More particularly, the pressure "$P_1$" corresponds in particular to a pressure supplied by a vacuum source of the vehicle. In the case of a controlled-ignition engine, the vacuum pressure "$P_1$" is supplied, for example by a vehicle engine inlet manifold and, in the case of a compression-ignition engine of diesel type, the vacuum pressure "$P_1$" is, for example, supplied by a vehicle vacuum pump.

The front chamber 16 is connected to the vacuum source of the vehicle via a vacuum pipe 20 which opens into the casing 12.

The pneumatic booster 11 comprises a moving piston 22 of axis A which is secured to the moving partition 14. For example, the moving piston 22 is fitted through the moving partition 14.

Inside the casing 12, the moving partition 14 is returned elastically backward by a return spring 24 which bears against the casing 12 and against a front face 26 of the moving piston 22. The front face 26 of the moving piston 22 has a front cylindrical bearing surface 27 which is arranged facing a reaction disk 32 in reaction which is housed in a cup 30 secured to the actuating rod 28 of the master cylinder 13.

A control rod 38 which, for example, is connected to a vehicle brake pedal via a coupling sleeve 41, can move in the moving piston 22, selectively according to an axial input force exerted forward on the sleeve 41. The actuating force is exerted against the action of a return force produced on the rod 38 by a return spring 40 which is inserted between the moving piston 22 and the control rod 38.

The front end of the control rod 38 which is the opposite end to the sleeve 41 is shaped as a ball 42 and housed in a complementary housing 44 belonging to a roughly cylindrical plunger 46 which is slideably mounted in the moving piston 22.

Figure 2:
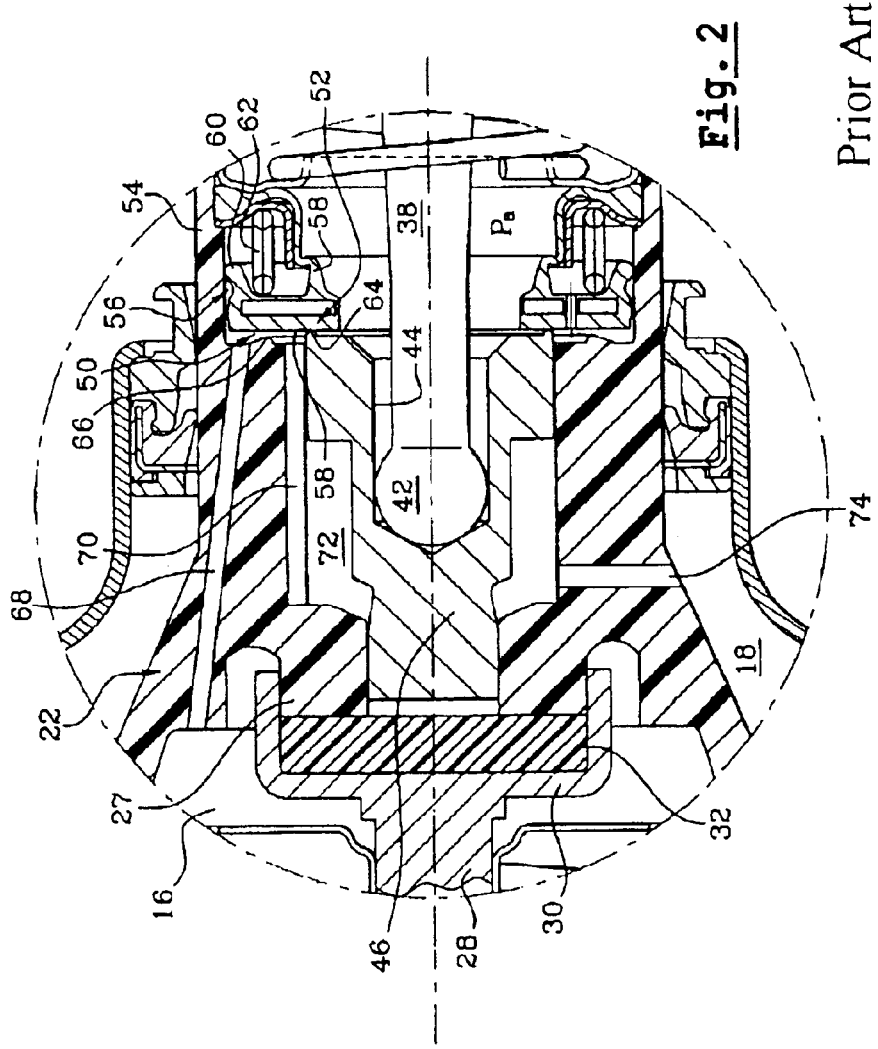
FIG. 2 is a detailed view of the booster of FIG. 1.

As illustrated more particularly in FIG. 2, the movements of the control rod 38 are able to determine the openings and closings of at least one axial intake valve 52 which is inserted between a pressure source subjected to the pressure "$P_a$" higher than the first pressure "$P_1$" and the rear chamber 18, and of at least one axial equalizing valve 50 which is inserted between the front chamber 16 and the rear chamber 18, to actuate the aforementioned moving partition.

In a known way, and in a way which does not restrict the invention, the pressure source subjected to the pressure "$P_a$" corresponds to the ambient atmospheric environment. For this purpose the valve 50 opens directly into a rear end 54 of the body of the piston 22 forming an axial duct which is open to the open air.

In the conventional way, the equalizing valve 50 and the intake valve 52 form part of a single three-way valve 56 a common seat 58 of which consists of a stepped front face of a moving annular element 60 returned elastically by a spring 62 against a flange 64 on the plunger 46 and against a flange 66 on the piston 22.

Thus, a roughly radial duct 68 which passes through the piston 22 and which opens into the front chamber 16, or alternatively the roughly axial duct 54 which opens to the outside of the booster 11, can be placed selectively in communication, by way of a plunger guide bore 72 and of a groove 70 made in this bore, with a radial duct 74 which passes through the piston 22 and opens into the rear chamber 18 to maintain or cancel a pressure difference between the front 16 and rear 18 chambers and thus cause the moving partition 14 to move.

Such a design is particularly expensive to implement because it entails the use of a piston of which the interior shapes, intended to form the ducts 68 and 74, can be produced only using a machining method.

To remedy this disadvantage, the invention proposes a booster 11 of the type described previously in which the intake and equalizing ducts are formed in tubular elements of the booster 11.

For this, as illustrated in FIGS. 3 to 7, the booster 11 comprises, according to a first embodiment:

a floating tubular element 76 external to the plunger 46, which is axially mobile and which is elastically returned toward the moving partition, of which axially offset transverse faces 78, 80 have respective first sealing elements 82, 84 for the axial intake and equalizing valves 50, 52, a complementary transverse second sealing element 86 for the axial intake valve 52, borne by the rear end of the plunger 46, a complementary transverse second sealing element 88 for the axial equalizing valve 50, consisting of at least one portion of the rear face 90 of the moving partition.

According to the invention, at least a first sealing element consists of a seal borne by an attached tubular bushing 92 slideably mounted in the floating tubular element 76. In the preferred embodiment of the invention, this first sealing element is the first sealing element 82 for the axial intake valve and the bushing 92 is slideably mounted in the rear end of the tubular element 76.

More specifically, as illustrated by FIGS. 4 to 7, the floating tubular element 76 comprises a tubular intermediate section 94, which is slideably mounted in an intermediate section 96 of the piston 22 which is roughly cylindrical and around a tubular bearing surface 98 of the moving partition which slideably houses the plunger 46. The tubular bearing surface 98 extends axially from the rear face 90 of the moving partition 14.

The floating tubular element 76 also comprises a tubular front end section 100 of a diameter greater than the diameter of the intermediate section 94, which is housed in a perforated front section 102 of the piston 22 lying where the piston 22 and the moving partition meet. The front section 102 internally houses a seal 104 of which a front face forms the first sealing element 84 for the equalizing valve 50. The front face 84 of the seal 104 is intended to collaborate with the portion 88 of the rear face 90 of the moving partition 14 forming the second sealing element of the equalizing valve 50, which face is arranged radially on the outside of at least one drilling 106 providing communication between the front chamber 16 and the rear chamber 18 so as to interrupt communication between the front 16 and rear 18 chambers. Furthermore, an internal bearing surface 83 of the seal 104 slides in contact with the tubular bearing surface 98 of the moving partition to allow air to pass only between the front face 84 of the seal 104 and the portion 88 of the rear face 90 of the moving partition 14.

For this, the moving partition 14 comprises a plurality of drillings 106 which are uniformly angularly distributed across the transverse partition 14 and which open more or less around the place where the tubular bearing surface 98 and the rear face 90 meet.

The floating tubular element 76 finally comprises a tubular rear end section 108, of a diameter smaller than the diameter of the intermediate section 94, which internally houses the tubular bushing 92 of which the transverse front end face 78 bears the seal 82 forming the first sealing element for the intake valve 52 which is intended to collaborate with the second sealing element 86 borne by the plunger 46. A bore 110 of the bushing 92 sealingly surrounds an axial inlet take duct 112 in the piston communicating with the pressure source subjected to the pressure "$P_a$" greater than the first pressure "$P_1$".

It will be noted that in order to obtain a satisfactory seal, the rear end of the bushing 92 has an internal groove 116 in which there is housed a seal 114 which is placed in contact with the external periphery 118 of the duct 112.

Advantageously, to ensure the elastic return of the element 76 toward the moving partition 14, a stepped face 120 delimiting the tubular intermediate section 94 and the tubular rear end section 108 of the tubular element has, bearing against it, the end of a return spring 122 the other end of which bears against a stepped face 124 of the tubular piston 22.

In the preferred embodiment of the invention, the intermediate section 96 of the piston 22, of a determined diameter, comprises the intake duct 112, of a diameter smaller than the determined diameter, with which it is integrally formed, and the intake duct 112 is connected to the intermediate section 96 by way of a transverse wall 126 formed integrally a front face of which forms the stepped face 124 which has bearing against it the return spring 122 of the tubular element and the rear face of which forms a stepped face 128 having, bearing against it, the return spring 40 of the control rod 38.

Advantageously, the plunger 46 is returned against its stop in its rest position by a radial stop pin 134, of which the ends 136 external to the piston 22 are able to bear against the casing 12 of the booster. The pin 134 passes through a drilling 138 in the plunger 46, through two diametrically opposed slots 140 in the tubular bearing surface 98 of the moving partition 14, through two diametrically opposed slots 142 in the element 76, and through two diametrically opposed slots 144 in the piston 22.

Advantageously, the diametrically opposed slots 144 to in the piston 22 form part of the perforations of the piston 22, which allow air from the front chamber 16 to pass toward the rear chamber 18 when the equalizing valve 50 is open, or allow the passage of air from the external surroundings originating from the duct 112 when the intake valve 52 is open.

Figure 3:
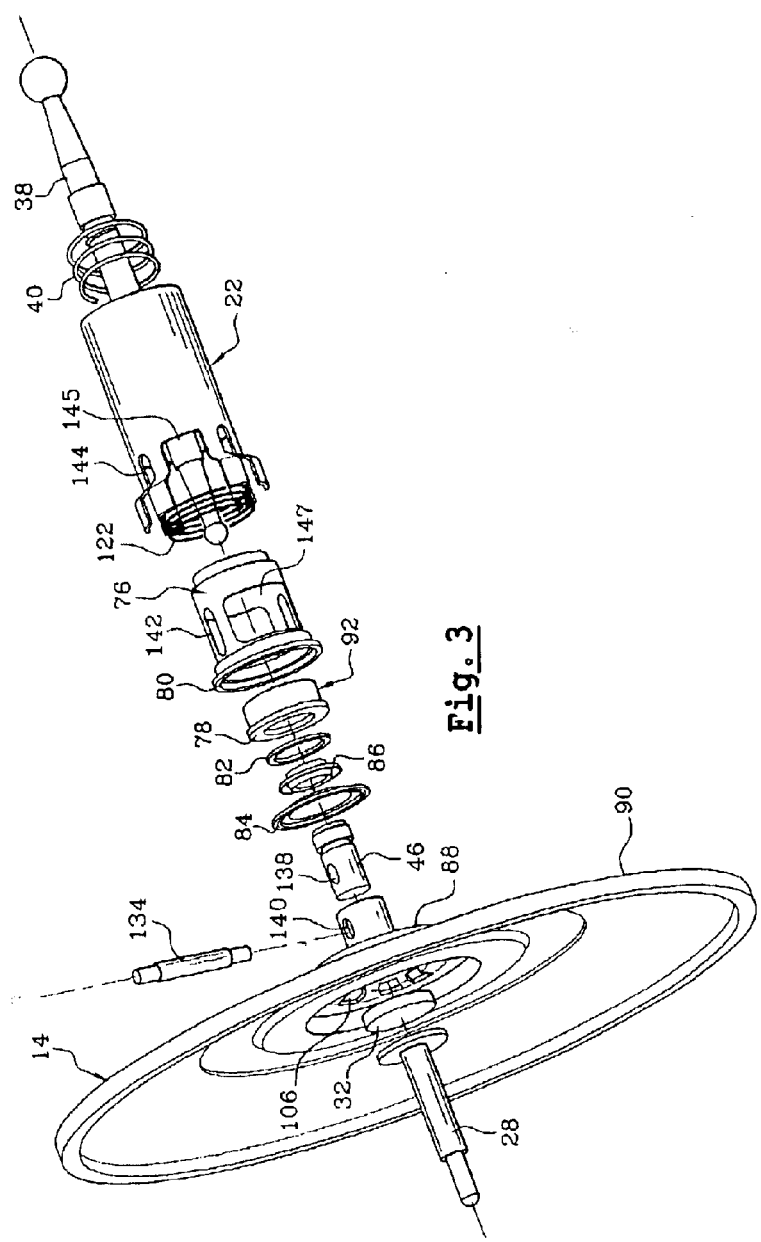
FIG. 3 is a perspective view of the elements internal to the casing of a booster according to a first embodiment of the present invention.

It will be understood that the perforations of the piston 22 and that the front section 106 of the piston 22 may have additional slots, for example slots 145 as depicted in FIG. 3.

More generally, the element 76 may also have additional slots 147 for communication with the rear chamber 18, as depicted in FIG. 3.

The transverse second sealing element 86 for the axial intake valve consists of a rear face of a cup 130 which is mounted tightly on the rear end 132 of the cylindrical plunger 46. The transverse rear face 86 of the cup extends facing the seal 82 forming the transverse first sealing element.

One of the main advantages of the invention is that, because of the cylindrical or tubular shapes of the moving partition 14, of the floating tubular element 76, of the tubular bushing 92 which is slideably mounted in the floating tubular element 76 and held in contact with it by the action of the spring 122, of the piston 22, and of the cup 130 secured to the plunger 46, air is encouraged to flow through the valves, this making it possible to reduce the response times of the booster 11, while guaranteeing its silent operation.

Furthermore, all these elements can be produced by cutting and pressing methods. This configuration is particularly advantageous because it allows the booster 11 to be made at a low cost of manufacture.

In this configuration, the internal elements of the booster 11 can occupy four different configurations which have been depicted in FIGS. 4 to 7.

Figure 4:
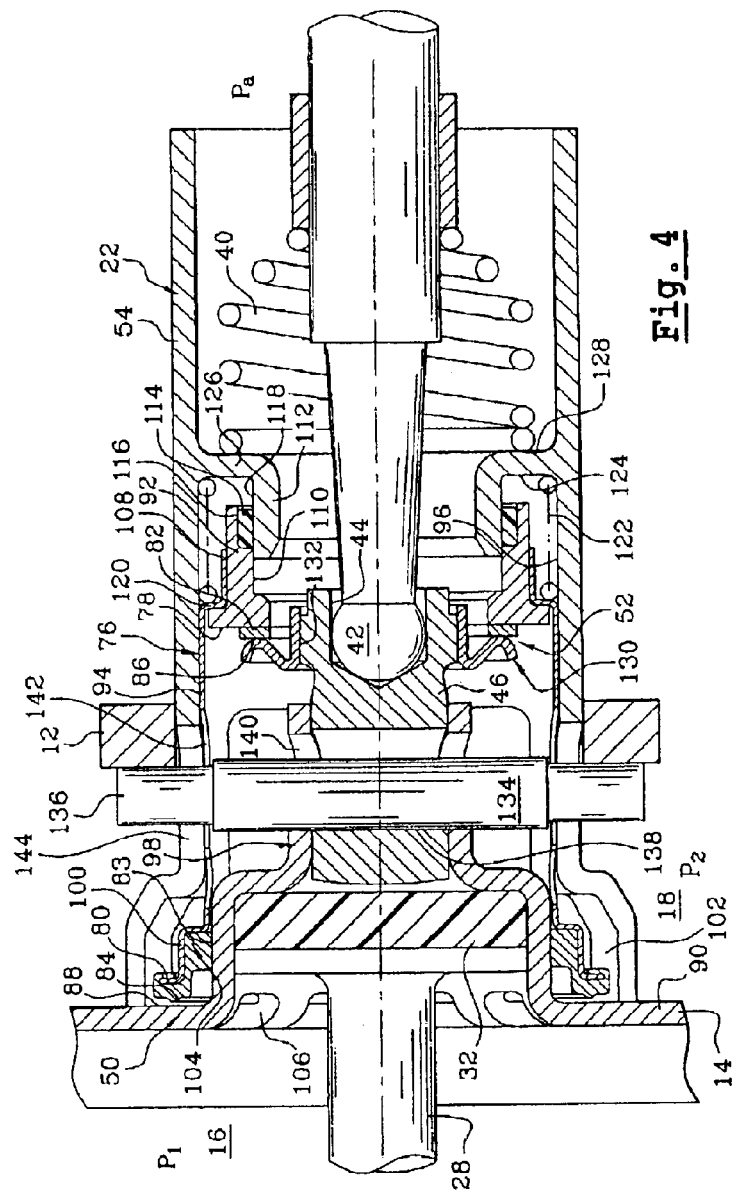
FIG. 4 is a detailed view in axial section of a booster produced according to the first embodiment of the present invention, the plunger being at rest, the equalizing valve being open and the intake valve being closed.

As illustrated in FIG. 4, the control rod 38 is able to occupy a position of rest. In this position, the air intake valve 52 is closed and the equalizing valve 50 is open, which means that the front 16 and rear 18 chambers are subjected to the same pressure "$P_1$". The moving partition is therefore immobile. The piston 22 is held in its rest position by the pin 134 which is bearing against the casing 12.

Figure 5:
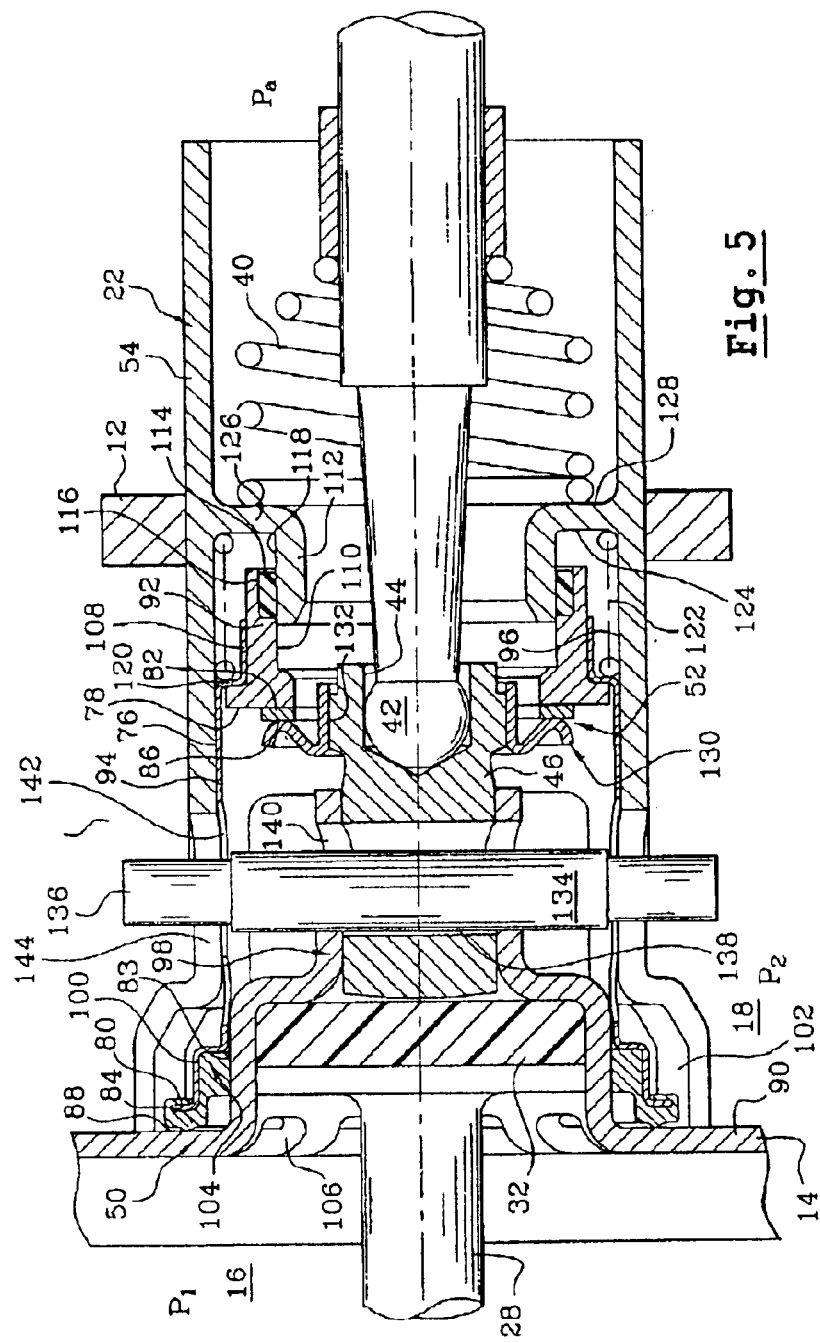
FIG. 5 is a detailed view in axial section of a booster according to the first embodiment of the present invention, the plunger being actuated and the equalizing valve and the intake valve being closed.

Starting out from this position, a forward movement of the control rod 38 gives rise to a forward movement of the plunger 46 and of the cup 86 connected to it, as depicted in FIG. 5. In the course of this forward movement the plunger 46 no longer opposes the forward movement of the bushing 92 and of the tubular element 76, which is therefore returned toward the moving partition 14 by the return spring 122. During the forward movement of the element 76, the intake valve 52 remains closed because the seal 82 remains in contact with the rear face 86 of the cup 130 secured to the plunger 46. Next, the forward movement of the tubular element 76 causes the closure of the equalizing valve 50 and thus isolates the front chamber 16 from the rear chamber 18 as soon as the front face 84 of the seal 104 comes into contact with the portion 88 of the rear face 90 of the moving partition 14. The piston 22, pushed back by the control rod 38 and by the return spring 40, is held bearing against the face 90 of the moving partition 14.

Figure 6:
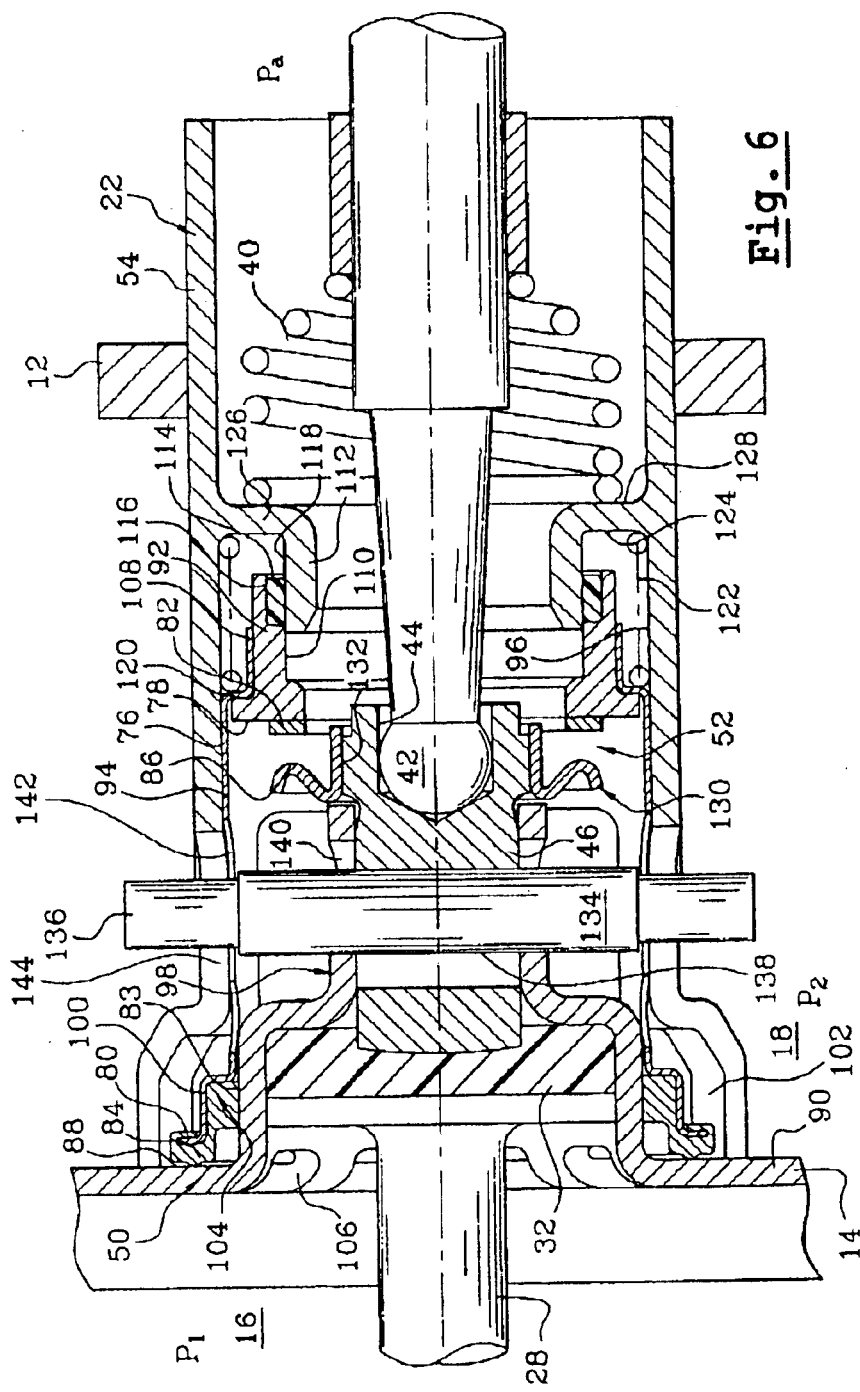
FIG. 6 is a detailed view in axial section of a booster produced according to the first embodiment of the present invention, the plunger being actuated, the equalizing valve being closed and the intake valve being open.

Next, as depicted in FIG. 6, with the control rod 38 continuing to move forward, the plunger 46 moves forward, taking with it the cup 130 of which the face 86 detaches from the seal 82, causing the opening of the intake valve 52. Air at atmospheric pressure "$P_a$" enters the rear chamber 18, and this has the effect of creating a pressure difference across the moving partition 14 and therefore of causing the partition 14 to move forward. The piston 22 continues its forward movement with the assistance of the force exerted on the moving partition 14 and the pin 134 breaks contact with the casing 12 of the booster 11.

Figure 7:
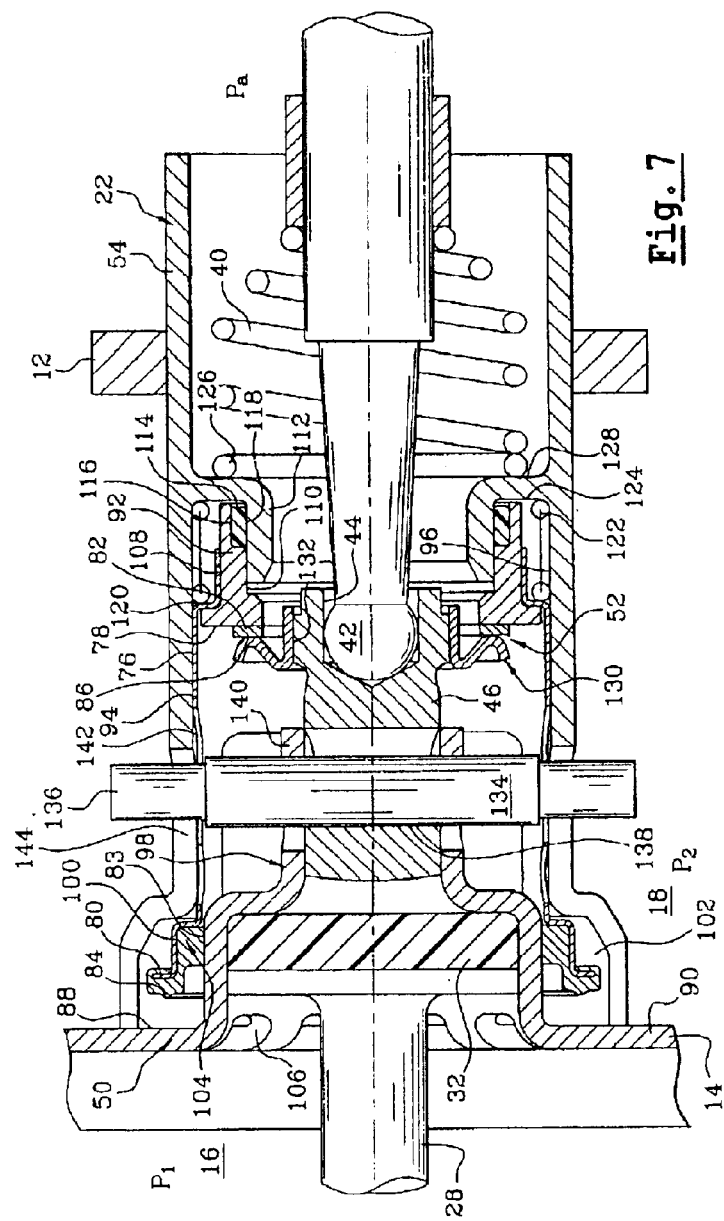
FIG. 7 is a detailed view in axial section of a booster produced according to the invention, the plunger being released, the equalizing valve having reopened and the intake valve having closed again.

If the control rod is released as depicted in FIG. 7, the reverse movement of the plunger 46 first of all causes the intake valve 52 to close then causes the equalizing valve 50 to reopen. Air at atmospheric pressure "$P_a$" contained in the rear pressure chamber 18 is removed into the front pressure chamber 14 subjected to the vacuum pressure "$P_1$".

FIGS. 8 to 11 illustrate a second embodiment of a booster 11 according to the present invention, comprising:

a floating tubular element 76 which is slideably mounted on a rear section 23 of the tubular piston 22 and is returned elastically toward the moving partition 14, of which a transverse face 78 comprises a transverse first sealing element 82 for the axial intake valve 52 and of which an offset other transverse face 80 comprises a transverse first sealing element 84 for the axial equalizing valve 50, a complementary transverse second sealing element 86 for the axial intake valve 52, borne by the plunger 46, and a complementary transverse second sealing element 88 for the axial equalizing valve 50, consisting of at least one portion of the face 90 delimiting the front 21 and the rear 23 sections of the piston 22, and in that it comprises a return spring 150 inserted axially into the floating tubular element 76 between the plunger 46 and the rear section 23 of the tubular piston 22 so as to exert a return force on the control rod 38.

The axial intake valve 52 is arranged at the rear end of an interior chamber 25 of the tubular piston 22 which chamber is formed in the rear section 23 of the piston 22 and communicates radially with the rear chamber 18, the transverse first sealing element 82 for the axial intake valve 52 surrounding an axial intake duct 108 which is formed in the floating tubular element 76 and which communicates with the external surroundings at the pressure "$P_a$" and the complementary transverse second element 86 for sealing the axial intake valve 52 being received with clearance in an axial drilling 29 in the piston 22 communicating with the interior chamber 25.

The axial equalizing valve 50 for its part is arranged on the outside of the tubular piston 22. It is arranged radially on the outside of at least one equalizing duct 106 of the tubular piston 22 placing the front chamber 16 and the rear chamber 18 in communication.

More particularly, the floating tubular element 76 comprises a tubular front section 100 slideably-mounted on the rear section 23 of the piston 22. The tubular front section 100 at its front free end bears the first sealing element 84 for the equalizing valve 50, which is intended to collaborate with the second sealing element 88 of the equalizing valve 50 borne by the portion of the rear face 90 of the front section 21 of the piston 22. To form the equalizing valve 50, the first and second sealing elements 84, 88 of the equalizing valve 50 are arranged radially at least in part on the outside of at least one drilling 106 providing communication between the front chamber 16 and the rear chamber 18 which passes through the front section 21 of the piston 22.

The floating tubular element 76 also comprises a tubular intermediate section 94 which is slideably mounted on the rear section 23 of the piston 22, and of which at least one longitudinal slot 142 is formed radially in line with at least one longitudinal slot 144 in the rear section 23 of the piston 22 which allows communication between the interior chamber 25 of the piston 22 and the rear chamber 18.

To guarantee a maximum air flow between the interior chamber 25 of the piston 22 and the rear chamber 18 of the booster when the intake valve 52 is open, the intermediate section 94 of the floating tubular element 76 has a plurality of longitudinal slots 142, for example three slots arranged radially 120° apart, each arranged in line with the same number of longitudinal slots 144 in the rear section 23 of the piston 22. The tubular intermediate section 94 of the floating tubular element 76 also comprises at least one interior rotation-proofing finger 156 which is slideably mounted in at least one of the said slots 144 of the rear section 23 of the piston 22.

The floating tubular element 76 finally comprises a tubular rear section 108, of a diameter smaller than the diameter of the intermediate section 94, which forms the duct 108 communicating with the external surroundings at the pressure "$P_a$" and which is slideably mounted on at least one tubular rear section 110 of the plunger 46. The tubular section 110 advantageously has the control rod 38 passing through it.

To form the intake valve 52, a transverse joining wall 91 joining the intermediate 94 and rear 108 sections of the tubular element 76, and arranged more or less axially near the drilling 29 in the end of the tubular rear section 23 of the piston 22, comprises on its front face 78 the first sealing element 82 for the axial intake valve 52 which is intended to collaborate with the second sealing element 86 for the axial intake valve 52 which is borne by the plunger 46 and which is housed in the said end drilling 29 of the tubular rear section 23 of the piston 22.

The sealing elements for the intake 52 and equalizing 50 valves may be produced in various known ways able to guarantee that the valves 50, 52 seal perfectly when they are closed.

However, in the preferred embodiment of the invention, the first sealing element 82 for the axial intake valve 52 consists of an annular part of the front face 78 of the transverse wall 91 where the intermediate 94 and rear 108 sections of the tubular element 76 meet.

The complementary transverse second element 86 sealing the axial intake valve 52, which is arranged facing this annular part 82, consists of an annular seal borne by an annular rear face 102 of a cup 104 which is borne by the plunger 46 and which is housed with clearance in the end drilling 29 of the chamber 25 of the tubular piston 26.

In the preferred embodiment of the invention, the cup 104 is inserted between a front section 111 and the rear section 110 of the plunger 46, with which sections it is integrally formed, but this arrangement places no limitation on the invention. In particular, the cup 104 could be an attached cup crimped onto the body of the plunger 46.

As a preference, the annular seal 86 is housed in a groove in the rear face 102 of the cup 104 into which it is, for example, bonded.

To guarantee perfect sealing between the rear chamber 18 and the external surroundings at the pressure "$P_a$" when the intake valve 52 is closed, an annular seal 152 is inserted between a tubular rear section 154 of the casing 12 and the tubular rear section 108 of the floating tubular element 76, so as to provide sealing between the external surroundings and the rear chamber 18 of the booster 11.

The first sealing element 84 of the axial equalizing valve 50 consists of an annular seal 84 which is housed in a groove 85 made in the free front face of the tubular front end section 100 of the tubular element 76. The seal 84 is, for example, fitted into the groove 85.

The complementary transverse second element 88 for sealing the axial equalizing valve consists of an annular portion of the rear face 90 delimiting the front 21 and rear 23 sections of the tubular piston 22.

To form equalizing ducts 106 able to guarantee a maximum air flow, the front section 21 of the piston 22 has a plurality of drillings 106 which are uniformly angularly distributed across the said front section 21, which open into the rear face 90 delimiting the front 21 and rear 23 sections of the tubular piston 22. This configuration guarantees a maximum air flow during the equalizing of the front 16 and rear 18 chambers.

As will be seen in the remainder of this description, the tubular element 76 is returned to positions of rest, of saturation, and of equilibrium of the booster 11 against the piston 22 in such a way that the equalizing valve 50 remains closed, this being so as to allow the booster 11 to have more rapid response times while at the same time limiting the length of the equalizing phase. For this, a stepped face 120 delimiting the front section 100 and the intermediate section 94 of the tubular element 76 has bearing against it the end of a return spring 122 the other end of which bears against a stepped face 124 of the casing 12.

Furthermore, the body of the piston 22 has an internal axial bore 126 which opens into the front face 26 of the piston 22 and into the interior chamber 25 of the piston 22. This internal axial bore 126 houses the end 31 of the actuating rod 28 of the master cylinder, which is shaped in the form of a bell housing 30 of a diameter more or less equal to that of the bore 126, the reaction disk 32, of a diameter more or less equal to that of the bore 126, and a step 138, with an outside diameter more or less equal to that of the bore 126, of a sliding bushing 128, through which the front section 111 of the plunger 46 passes. A front face 130 of the step 138, coaxial with a feeler 132 fixed to the end of the front section 11 of the plunger 46 is able, just like the said feeler 132, to act upon the reaction disk 32.

In this way, the actuating rod 28 is able, according to the rate of actuation of the control rod 38, to transmit the reaction of the master cylinder in a variable way, partly to the feeler 132 and partly to the piston 22, by way of the step 138. As such a configuration is well known in the prior art and does not form part of this description, it will not be described any more explicitly in the remainder of this description.

Advantageously, a transverse wall 134, formed at the end of the internal axial bore 126, forms, on the one side, a stop 136 for the step 138 of the bushing 128 and on the opposite side 140 receives the end of the return spring 150 the other end of which bears against a front face 151 of the cup 104 of the plunger 46. The return spring 150 is therefore advantageously housed in the floating tubular element 76 and, as a result, this configuration makes it possible to limit the axial space dedicated to the return spring by comparison with a conventional booster in which the return spring of the control rod is inserted in the axial intake duct between the casing and the control rod. The booster 11 is therefore even smaller in terms of axial bulk.

One of the chief advantages of the invention is that, because of the cylindrical or tubular shapes of the moving partition 14, of the floating tubular element 76, of the tubular intermediate bushing 128, of the piston 22 and of the plunger 46, air is encouraged to flow through the valves 50 and 52, making it possible to reduce the response times of the booster 11 while at the same time ensuring that it operates silently.

Furthermore, at least one of these elements, and preferably most of them, can be produced by cutting and pressing methods or alternatively by a method of molding using a plastic. This configuration is particularly advantageous because it makes it possible to produce the booster 11 for a low cost of manufacture.

Figure 9:
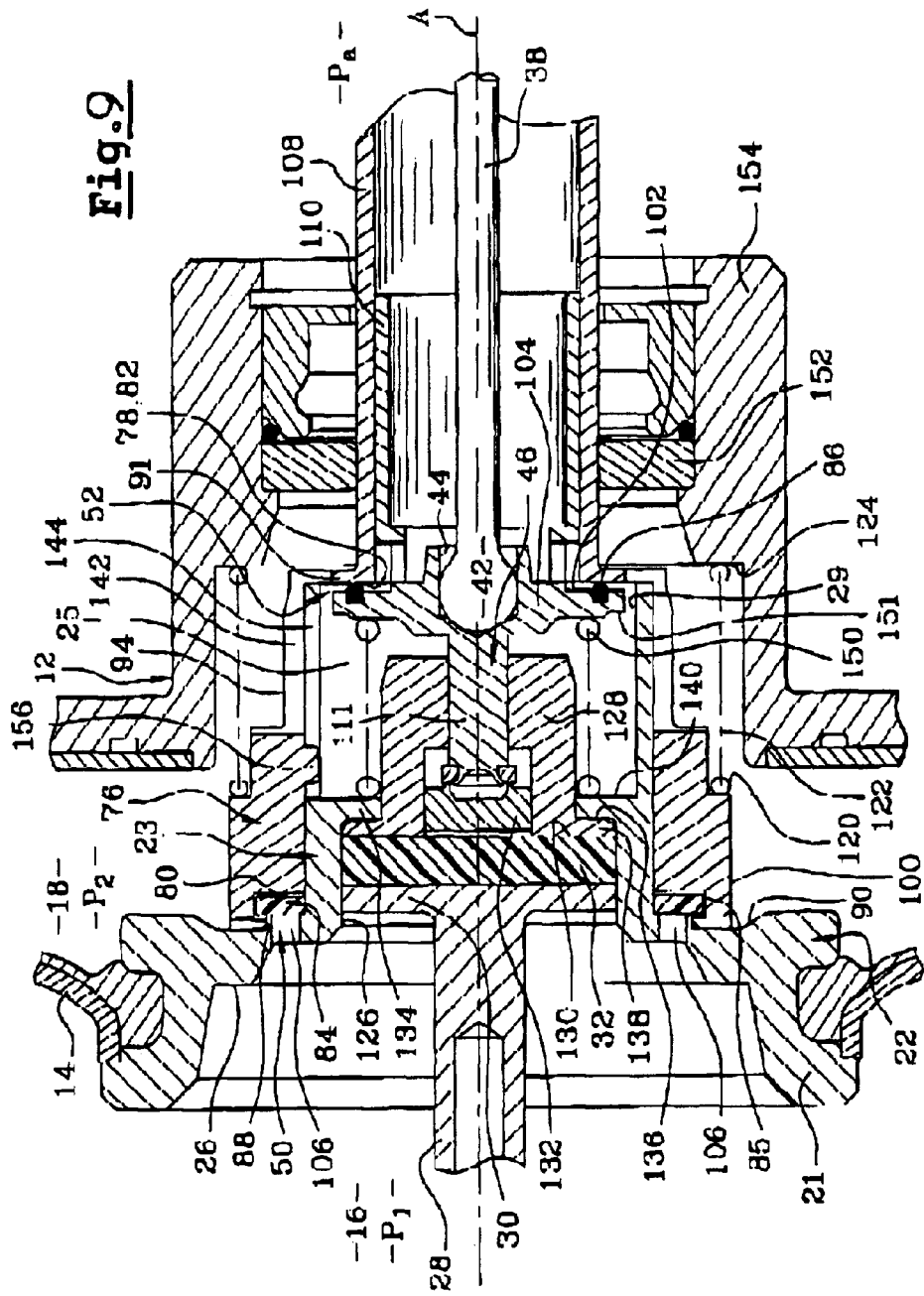
FIG. 9 is a detailed view in axial section of a booster according to the second embodiment of the present invention, viewed in a position of equilibrium, the plunger being actuated, the equalizing valve being closed and the intake valve being closed.
Figure 10:
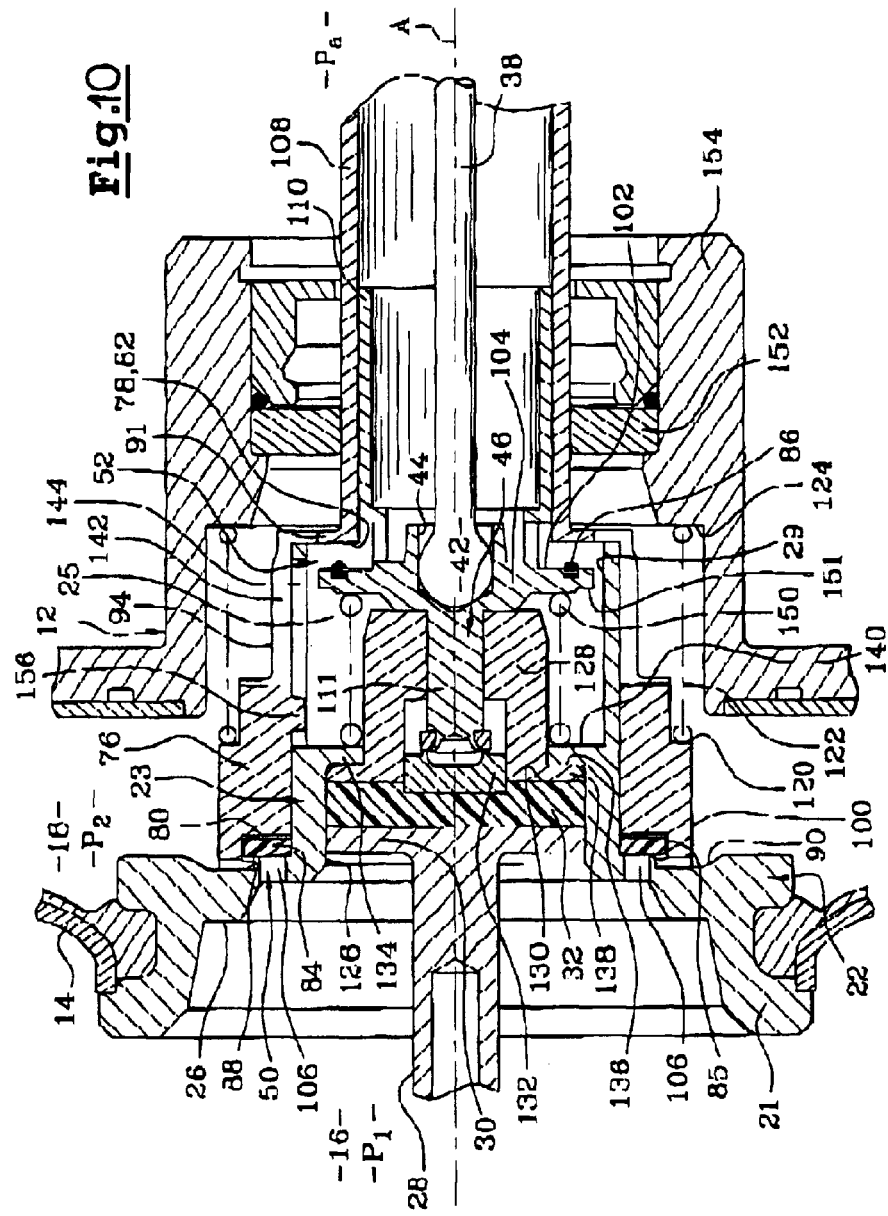
FIG. 10 is a detailed view in axial section of a booster according to the second embodiment of the present invention viewed in a saturation position, the plunger being actuated, the equalizing valve being closed and the intake valve being open.

In this configuration, the internal elements of the booster 11 are able to occupy four different configurations which have been depicted in FIGS. 9 to 11.

Figure 8:
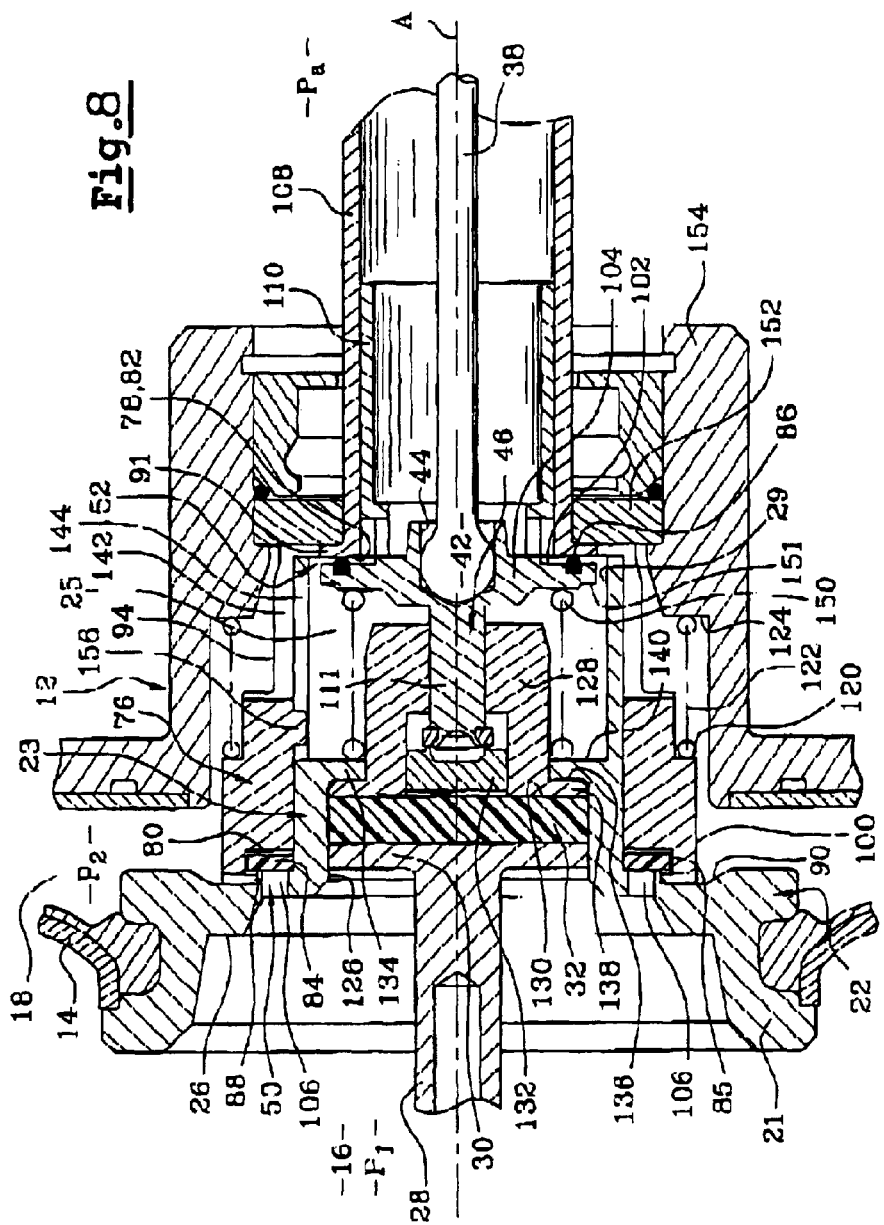
FIG. 8 is a detailed view in axial section of a booster according to a second embodiment of the present invention, viewed in a position of rest, the plunger being at rest, the equalizing valve being closed and the intake valve being closed.

As depicted in FIG. 8, which depicts a position of rest of the booster, the control rod 38 can occupy a position of rest. In this position the cup 104 of the plunger 46 is returned against the wall 91 of the tubular element 76 by the spring 150 and so the air intake valve 52 is closed. The equalizing valve 50 is also closed because the front section 100 of the tubular element 76 is returned against the rear face 90 of the piston 22.

Initially, the front 16 and rear 18 chambers are subjected to the same vacuum pressure "$P_1$". The moving partition is therefore at rest.

Starting out from that position, a forward movement of the control rod 38 causes decompression of the return spring 122 of the tubular element as far as a position known as the position of equilibrium of the booster, which has been depicted in FIG. 9. The decompression of the return spring 122 of the tubular element pushes the piston 22 and the moving wall 14 forward and allows the start of actuation of the control rod 28 of the master cylinder.

Furthermore, as the spring 122 is decompressed, it now presses the wall 91 of the tubular element 76 only lightly against the cup 104 of the plunger 46. The valves 50 and 52, however, remain closed.

A forward movement of the control rod 38 causes compression of the return spring 150 of the plunger 46, and this allows the cup 104 to detach from the wall 91 of the tubular element 76 and therefore allows the intake valve 52 to open, as depicted in FIG. 10 which depicts a position of the booster known as the saturation position. Air at atmospheric pressure "$P_a$" therefore enters the interior chamber 25 of the piston 22 and passes through the slots 142, 144 to fill the rear chamber 18, and this has the effect, because of the difference in pressure between the rear chamber 18 and the front chamber 16, of actuating the moving partition 14 and therefore the piston 22 and the actuating rod 28 of the master cylinder.

Finally, if the control rod 38 is released, as depicted in FIG. 11 which illustrates a return position of the booster 11, the tubular element 76 is returned by the cup 104, which once again bears against the wall 91 of said tubular element 76, even before the pressure difference between the rear 18 and front 16 chambers cancels out. As a result, the front section 100 of the tubular element 100 separates from the rear face 90 of the piston 22, and this briefly causes the equalizing valve 50 to open. Air at atmospheric pressure in the rear chamber 18 is therefore removed into the front chamber 16 and the front 16 and rear 18 chambers find themselves once again subjected to the vacuum pressure "$P_1$" as depicted earlier in FIG. 4.

The time taken by the booster 11 to return to the rest position is therefore considerably shortened because of the shorter length of the equalizing phase spent equalizing the pressures between the front 16 and rear 18 chambers.

The invention therefore provides the benefit of a booster which enjoys a shorter response time and particularly quiet operation and which in addition calls largely upon a pressed or molded tubular design, allowing it to be manufactured at a lower cost.

We claim:

1. A pneumatic brake booster (11) for a motor vehicle having a rigid casing (12) with a transverse partition (14) sealingly located therein to delimit a front chamber (16), subjected to a first pressure ($P_1$) from a rear chamber (18) subjected to a second pressure ($P_2$) that varies between the first pressure ($P_1$) and a pressure ($P_a$) higher then the first pressure ($P_1$), said transverse partition (14) acting on an actuating rod (28) of a master cylinder (13) associated with the booster (11) by way of a reaction disk (32), a tubular moving piston (22) that is slideably mounted in the casing (12) and is secured to said transverse partition (14), a control rod (38) for selectively moving said piston (22) in according to an axial input force exerted forward against the action of a return force exerted on the control rod (38) via a return spring (40) wherein movements of the control rod determines the openings and closings of at least one axial intake valve (52) that is inserted between a pressure source subjected to the pressure ($P_a$) higher than the first pressure ($P_1$) and the rear chamber (18), and of at least one axial equalizing valve (50) that is inserted between the front chamber (16) and the rear chamber (18), to actuate the transverse partition (14), a plunger (46) that passes through the transverse partition (14) and is secured to the end of the control rod (38) that acts directly upon the actuating rod (28) of the master cylinder (13) by way of the reaction disk (32), characterized in that said brake booster (11) further comprises;

a floating tubular element (76) external to the plunger (46) that is axially mobile, is elastically returned toward the transverse partition (14) and has axially offset transverse faces (78, 80) with first sealing elements (82, 84) for the axial intake and equalizing valves (50, 52), said tubular element (76) tubular element (76) having a tubular intermediate section (94) that is slideably mounted in an intermediate section (96) of the piston (22) that is roughly cylindrical and engaging a tubular bearing surface (98) of the transverse partition (14) that slideably houses the plunger (46), a tubular front end section (100) having a diameter greater than the diameter of the intermediate section (94), said end section (100) being housed in a perforated front section (102) of the piston (22) at a position where the piston (22) and the transverse partition (14) meet, said end section (100) internally housing a seal (104) having a front face (84) that forms the first sealing element for the equalizing valve (50) and collaborate with a portion (88) of the rear face (90) of the transverse partition (14) to form the second sealing element for the equalizing valve (50) that is arranged radially on the outside of at least one equalizing duct (106) to provide communication between the front chamber (16) and the rear chamber (18), a tubular rear end section (108) having a diameter that is smaller than the diameter of the intermediate section (94) and internally houses the tubular bushing (92) of which a transverse front end face (78) bears, a seal (82) forming the first sealing element for the intake valve (52) which is intended to collaborate with the second sealing element borne by the plunger, and of which a bore sealingly surrounds an axial intake duct (112) in the piston communicating with the pressure source subjected to the pressure ($P_a$) greater than the first pressure ($P_1$), a complementary transverse second sealing element (86) for the axial intake valve (52) that is borne by the rear end of the plunger (46); and a complementary transverse second sealing element (88) for the axial equalizing valve (50), consisting of at least one portion of the rear face (90) of the moving partition (14).

2. The pneumatic booster (11) according to claim 1, characterized in that at least a first sealing element (82) consists of a seal borne by an attached tubular bushing (92) slideably mounted in the floating tubular element (76).

3. The pneumatic booster (11) according to claim 1, characterized in that the plunger (46) is guided in a tubular bearing surface (98) that extends axially from the rear face (90) of the moving partition (14) and in that the moving partition (14) comprises a plurality of drillings (106) distributed angularly through the transverse partition (14) around the region when its tubular bearing surface (98) and its rear face (90) meet.

4. The pneumatic booster (11) according to claim 1, characterized in that a stepped face (120) delimiting the tubular intermediate section (94) and the tubular rear and section (108) of the tubular element (76) has, bearing against it, the end of a return spring (122) the other end of which bears against a stepped face (124) of the tubular piston (22).

5. The pneumatic booster (11) according to claim 4, characterized in that radial stop pin (134), of which the ends (136) external to the piston (22) are able to bear against the casing (12) of the booster (11), passes through a drilling (138) in the plunger (46), through two diametrically opposed slots (140) in the tubular bearing surface (98) of the moving partition (14), through two diametrically opposed slots (142) in the element (76), and through two diametrically opposed slots (144) in the piston (22).

6. The pneumatic booster (11) according to claim 5, characterized in that the diametrically opposed slots (144) in the piston form part of the perforations in the piston (22).

7. The pneumatic booster (11) according to claim 6, characterized in that the intermediate section (96) of the piston, of a determined diameter, includes the intake duct (112), of a diameter smaller than the determined diameter, with which it is integrally formed, and in that the intake duct (112) is connected to the intermediate section (96) by way of a transverse wall (126) formed integrally and a front face of which forms the stepped face (124) against which the return spring (122) of the tubular element (76) bears and the rear face of which forms a stepped face (128) against which the return spring (40) of the control rod (38) bears.

8. The pneumatic booster (11) according to claim 7, characterized in that the transverse second sealing element for the axial intake valve is borne by a cup (130) mounted tightly on the rear end (132) of the cylindrical plunger (46) and a transverse rear face (86) of which extends opposite the seal (82) forming the transverse first sealing element.

9. The pneumatic booster (11) according to claim 8 taken in combination, characterized in that the moving partition (14), the floating tubular element (76), the tubular bushing (92) kept in contact with the floating tubular element (76) by the action of the spring (122), the piston (22) and the cup (130) secured to the plunger (46) are produced using cutting and pressing methods.

10. The pneumatic booster (11) according to claim 1, characterized in that it comprises a return spring (150) inserted axially into the floating tubular element (76) between the plunger (46) and the rear section (23) of the tubular piston (22) so as to exert a return force on the control rod (38).

11. The pneumatic booster (11) according to claim 10, characterized in that:

the axial intake valve (52) is arranged at the end of an interior chamber (25) of the tubular piston (22) which chamber is formed in the rear section (23) of the piston (22) and communicates radially with the rear chamber (18), the transverse first sealing element (82) for the axial intake valve (52) surrounding an axial intake duct (108) which is formed in the floating tubular element (76) and which communicates with the external surroundings and the complementary transverse second element (86) for sealing the axial intake valve (52) being received with clearance in an axial drilling (29) in the piston (22) communicating with the interior chamber (25), the axial equalizing valve (50) is arranged on the outside of the tubular piston (22) and is arranged radially on the outside of at least one equalizing duct (106) of the tubular piston (22) placing the front chamber (16) and the rear chamber (18) in communication.

12. The pneumatic booster (11) according to claim 11, characterized in that the floating tubular element (76) comprises:

a tubular front section (100), slideably mounted on the rear section (23) of the piston (22), which bears the first sealing element (84) for the equalizing valve (50), and which is intended to collaborate with the second sealing element (88) of the equalizing valve (50) borne by the portion of the rear face (90) of the front section (21) of the piston (22), the first and second sealing elements (84, 88) for sealing the equalizing valve (50) being arranged radially at least in part on the outside of said at least one equalizing duct (106) providing communication between the front chamber (16) and the rear chamber (18) which passes through the front section (21) of the piston (22), a tubular intermediate section (94) which is slideably mounted on the rear section (23) of the piston (22), and of which at least one longitudinal slot (142) is formed radially in line with at least one longitudinal slot (144) in the rear section (23) of the piston (22) which allows communication between the interior chamber (25) of the piston and the rear chamber (18), a tubular rear section (108), of a diameter smaller than the diameter of the intermediate section (94), which forms the duct communicating with the external surroundings and which is slideably mounted on at least one tubular rear section (110) of the plunger (46) through which the control rod (38) passes, and in that a transverse joining wall (91) joining the intermediate (94) and rear (108) sections of the tubular element (76), and arranged more or less axially near the drilling (29) in the end of the tubular rear section (23) of the piston (22), comprises the first sealing element (82) for the axial intake valve (52) which is intended to collaborate with the second sealing element (86) for the axial intake valve (52) which is borne by the plunger (46) and which is housed in the said end drilling (29) of the tubular rear section (23) of the piston (22).

13. The pneumatic booster (11) according to claim 12, characterized in that:

the first sealing element (82) for the axial intake valve (52) consists of an annular part of the front face (78) of the transverse wall (91) joining the intermediate (94) and rear (108) sections of the tubular element (76), the complementary transverse second sealing element (86) for the axial intake valve (52) consists of an annular seal borne by an annular rear face (102) of a cup (104) carried by the plunger (46) and which is housed with clearance in the end drilling (29) of the chamber (25) of the tubular piston, the first sealing element (84) for the axial equalizing valve (50) consists of an annular seal which is housed in a groove (85) made in the front face of the tubular front and section (100) of the tubular element (76), the complementary transverse second sealing element (84) for the axial equalizing valve consists of an annular portion of the rear face (90) delimiting the front (21) and rear (23) sections of the tubular piston.

14. The pneumatic booster (11) according to claim 13, characterized in that the cup (104) is inserted axially between the rear (108) and front (111) sections of the plunger (46) with which it is integral.

15. The pneumatic booster (11) according to claim 12, characterized in that a stepped face (120) delimiting the front section (100) and the intermediate section (94) of the tubular element (76) has, bearing against it, the end of a return spring (122) the other end of which bears against a stepped face (124) of the casing (12).

16. The pneumatic booster (11) according to claim 12, characterized in that an annular seal (152) is inserted between a tubular rear section (154) of the casing (12) and the tubular rear section (108) of the floating tubular element (76), so as to provide a seal between the external surroundings and the rear chamber (18) of the booster (11).

17. The pneumatic booster (11) according to claim 12, characterized in that the intermediate section (94) of the floating tubular element (76) has a plurality of longitudinal slots (142) each arranged in line with longitudinal slots (144) in the rear section (23) of the piston (22), and in that the intermediate tubular section (94) of the floating tubular element (76) has at least one rotation-proofing finger (156) which is slideably mounted in at least one of the said slots (144) in the rear section (23) of the piston (22).

18. The pneumatic booster (11) according to claim 10, characterized in that it comprises a plurality of drillings (106) which are angularly distributed in a uniform manner through the front section (21) of the piston (22) and which open into the rear face (90) delimiting the front (21) and rear (23) sections of the tubular piston (22) to form the equalizing ducts (106).

19. The pneumatic booster (11) according to claim 10, characterized in that the body of the piston (22) has an internal axial bore (126) which opens into the front face (26) of the piston (22) and into the interior chamber (25) of the piston (22) and which houses:

the end (30) of the actuating rod (28) of the master cylinder, the reaction disk (32), a sliding bushing (128), through which there passes a front section (111) of the plunger (46), of which a step (138) constitutes a front face (130) coaxial with a feeler (132) formed at the front end of the plunger (46) to act upon the reaction disk (32).

20. The pneumatic booster (11) according to claim 19, characterized in that a transverse wall (134), formed at the end of the internal axial bore (126), forms, on the one hand, an end stop (136) for the step (138) of the bushing (128) and, on the opposite side (140) receives the end of the return spring (150) the other end of which rests against a front face (151) of the cup (104) of the plunger (46).

21. The pneumatic booster (11) according to claim 10, characterized in that at least one element out of the moving partition (14), the floating tubular element (76), the intermediate bushing (128), the plunger (46) and the piston (22), is produced using cutting and pressing methods.

22. The pneumatic booster (11) according to claim 10, characterized in that at least one element out of the moving partition (14), the floating tubular element (76), the intermediate bushing (128), the plunger (46) and the piston (22), is made using a method of molding a plastic.

23. A pneumatic brake booster (11) for a motor vehicle, having a rigid casing (12) with a transverse partition (14) sealingly that delimits a front chamber (16) that is subjected to a first pressure ($P_1$) from a rear chamber (18) that is selectively subjected to a second pressure ($P_2$) that varies between the first pressure ($P_1$) and a pressure ($P_a$) higher than the first pressure ($P_1$) said partition acting on and moving an actuating rod (28) of a master cylinder (13) associated with the booster (11) by way of a reaction disk (32), a tubular moving piston (22) that is slideably mounted in the casing (12) and is secured to the partition (14), a control rod (38) that moves in the piston (22) in according to an axial input force exerted forward against the action of a return force exerted on the rod (38) via a return spring (40), said control rod being moved to determine the openings and closings of at least one axial intake valve (52) that is inserted between a pressure source subjected to the pressure ($P_a$) higher than the first pressure ($P_1$) and the rear chamber (18), and of at least one axial equalizing valve (50) that is inserted between the front chamber (16) and the rear chamber (18), to actuate the moving partition (14), a plunger (46) that passes through the moving partition (14) and is secured to the end of the control rod (38), said plunger (46) acting directly upon the actuating rod (28) of the master cylinder (13) by way of the reaction disk (32), characterized in that said brake booster (11) comprises:

a floating tubular element (76) that is external to the plunger (46), is axially mobile and is elastically returned toward the moving partition (14), said tubular element (67) having axially offset transverse faces (78, 80) with first sealing elements (82, 84) for the axial intake and equalizing valves (50, 52), a complementary transverse second sealing element (86) for the axial intake valve (62), borne by the rear end of the plunger (46), a complementary transverse second sealing element (88) for the axial equalizing valve (50), consisting of at least one portion of the rear face (90) of the moving partition (14); and a return spring (150) inserted axially into the floating tubular element (76) between the plunger (46) and the rear section (23) of the tubular piston (22) so as to exert said return force on the control rod (38).

24. The pneumatic booster (11) according to claim 23, characterized in that said axial intake valve (52) is arranged at the end of an interior chamber (25) of the tubular piston (22) which chamber is formed in the rear section (23) of the piston (22) and communicates radially with the rear chamber (18), said transverse first sealing element (82) for the axial intake valve (52) surrounding an axial intake duct (108) that is formed in the floating tubular element (76) and communicates with the external surroundings and said complementary transverse second element (86) for sealing the axial intake valve (52) being received with clearance in an axial drilling (29) in the piston (22) that communicates with the interior chamber (25), said axial equalizing valve (50) being arranged on the outside of the tubular piston (22) and arranged radially on the outside of at least one equalizing duct (106) of the tubular piston (22) placing the front chamber (16) and the rear chamber (18) in communication.

25. The pneumatic booster (11) according to claim 24, characterized in that said floating tubular element (76) comprises;

a tubular front section (100) that is slideably mounted on a rear section (23) of said piston (22), which bears the first sealing element (84) for the equalizing valve (50), and collaborates with the second sealing element (88) of the equalizing valve (50) that is borne by a portion of the rear face (90) of the front section (21) of the piston (22), said first and second sealing elements (84, 88) for sealing the equalizing valve (50) being arranged radially at least in part on the outside of said at least one equalizing duct (106) to provide communication between the front chamber (16) and the rear chamber (18) which passes through the front section (21) of the piston (22), a tubular intermediate section (94) that is slideably mounted on the rear section (23) of the piston (22), and of which at least one longitudinal slot (142) is formed radially in line with at least one longitudinal slot (144) in the rear section (23) of the piston (22) to allows communication between the interior chamber (25) of the piston and the rear chamber (18), a tubular rear section (108) having a diameter that is smaller than the diameter of the intermediate section (94) that forms a duct communicating with the external surroundings and which is slideably mounted on at least one tubular rear section (110) of the plunger (46) through which the control rod (38) passes; and a transverse joining wall (91) joining the intermediate (94) and rear (108) sections of the tubular element (76), and arranged more or less axially near the drilling (29) in the end of the tubular rear section (23) of the piston (22), comprises the first sealing element (82) for the axial intake valve (52) that collaborates with said second sealing element (86) for the axial intake valve (52) which is borne by the plunger (46) and which is housed in the said end drilling (29) of the tubular rear section (23) of the piston (22).

* * * * *